(12) United States Patent
Wilson et al.

(10) Patent No.: US 11,960,151 B2
(45) Date of Patent: Apr. 16, 2024

(54) EYEWEAR WITH ENGAGEABLE PROTECTIVE SHIELD

(71) Applicants: Ken Wilson, Yuma, AZ (US); Rich Belitz, Yuma, AZ (US)

(72) Inventors: Ken Wilson, Yuma, AZ (US); Rich Belitz, Yuma, AZ (US)

(73) Assignee: Fast Metal LLC, Yuma, AZ (US)

( * ) Notice: Subject to any disclaimer, the term of this patent is extended or adjusted under 35 U.S.C. 154(b) by 145 days.

(21) Appl. No.: 17/357,575

(22) Filed: Jun. 24, 2021

(65) Prior Publication Data

US 2022/0413322 A1    Dec. 29, 2022

(51) Int. Cl.
*G02C 9/04* (2006.01)
*G02C 5/14* (2006.01)
*G02C 7/10* (2006.01)

(52) U.S. Cl.
CPC ............. *G02C 9/04* (2013.01); *G02C 5/146* (2013.01); *G02C 7/10* (2013.01); *G02C 2200/08* (2013.01)

(58) Field of Classification Search
CPC . G02C 9/04; G02C 5/146; G02C 7/10; G02C 2200/08; G02C 5/10
USPC ................................................ 351/41, 44, 47
See application file for complete search history.

(56) References Cited

U.S. PATENT DOCUMENTS 3,238,005 A * 3/1966 Petitto ...................... G02C 9/00
351/59

* cited by examiner

*Primary Examiner* — Tuyen Tra
(74) *Attorney, Agent, or Firm* — Donn K. Harms (57) ABSTRACT

An eyeglass frame configured to hold corrective lenses therein is removably engageable with a protective lens. The protective lens has connectors on opposing ends which are engageable with first and second mounts engaged to the frame. A gap is formed between the protective lens and the front surface of the frame and is maintained by the engagement of the connectors with the respective mounts.

6 Claims, 6 Drawing Sheets

EYEWEAR WITH ENGAGEABLE PROTECTIVE SHIELD

BACKGROUND

1. Field of the Invention

The invention relates to eyewear such as eyeglasses with corrective or other lenses engaged in eyewear frame openings. More particularly, the disclosed device relates to a device and system for the removable positioning of a protective lens or shield in a removable engagement with an eyeglass frame to allow a user to wear eyeglass frames with prescription or other lenses therein, and engage one or more protective lenses such as sunglass lenses to the frame.

2. Prior Art

Prescription eyeglasses have been provided to users requiring lenses to correct or aid in their vision for many years. Such eyeglasses conventionally will employ an eyeglass frame which holds a pair of lenses which have been individually ground or formed, to provide optical correction to the user wearing the corrective lenses over each eye. The frame conventionally has temples which engage over the sides of the face of the users and have distal ends which are supported by respective ears of the user.

A frequently worn type of eyewear, for vision correction for a large number of users, is one where the eyeglasses have lenses configured for reading. This is especially true of older eyewear users who may have developed an issue with reading text close to their person. Other eyeglass wearers may see well for close up work and viewing but require optical correction with eyeglasses having lenses ground to provide clear long distance viewing. Modernly, with the advent of progressive lenses, many eyeglass wearers will have eyeglass frames holding lenses which provide optical correction for both far viewing as well as close up viewing.

However, being optically corrective is conventionally provided to users with clear lenses, especially where the lenses optically correct the view for close up viewing. Even with eyewear providing distance correction, or progressive vision correction, the majority of users are provided clear lenses with no polarization or tint for sunlight protection.

Due to operative requirements in blocking sunlight and glare at different times of the day as well as for style choices, users of corrective eyewear are left a difficult choice. They can either go without sunlight and glare protection or they can purchase multiple pairs of corrective eyewear where some include lenses which are tinted and/or polarized to provide sun and glare protection.

Because of the wide range of sun and glare protective lens treatments available, such users are left with difficult decisions with respect to color, tinting, and form over fashion in making the expensive choice to have multiple pairs of corrective eyewear which include differing sun and glare protection. Where the user participates in multiple activities such as skiing, biking, and other athletic endeavors, the cost to purchase corrective lenses, which include the sun and glare protection appropriate to the sport or venue of choice, is prohibitive. As such, they may just suffer through use of eyewear which corrects their vision but is less than appropriate for the use for which they intend them.

The forgoing examples of related art as to corrective eyewear, and limitations related therewith, are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF INVENTION

The device and method herein provides eyewear frames which are employable to operatively hold vision correcting or other lenses within openings in the frame. The frame is positionable on the face of users in operative positioning with a central portion supported on the nose of the user and temples supported on the ears of the user, where they may see through the two lenses. The eyewear frame includes a first and second mount on opposing ends thereof, which are configured to removably engage with connectors and a ledge adjacent the connectors on opposing ends of a protective lens. In an alternative mode, the device can be configured with a plurality of different protective lenses available in differing shapes, tints, and glare correction such as polarization, all of which are configured with attachments such as projections which removably engage with mounts on opposite ends of the eyewear frame.

The eyewear device and system herein, can be provided in the form of the mounts which are configured to engage with connectors on the protective lens as a retrofit to existing eyewear frames. In this mode, once the mounts are engaged on any conventional pair of eyewear having a frame and temples, one or a plurality of different protective lenses having connectors engageable with the mounts, may be engaged to the frame.

In a more preferred mode of the device, it is provided with the eyewear frames which may include or be engaged with vision corrective lenses. In this mode, the mounts are engaged with the frame or the temples engaged with the frame and are positioned to engage and pull opposing ends of the protective lens toward a front surface of the frame Additionally preferred in the device and system herein, is the provision of a matched combination of corrective optics in combination with removably engageable protective lens such as a sun and glare shielding lens. In this fully configured mode which has been shown to provide optics that can be very accurate due to the configuration and provision of all the components, the device is provided with eyeglass frames which may be fitted with corrective lenses for the vision of the user. The frame, so provided, is configured with mounts which are operatively engageable with connectors and ledges adjacent thereto which are placed on one or more protective lenses such as sun or glare protective lenses.

This complete configuration allows the user to have prescriptive lenses for any type or combination of vision correction, ground and operatively engaged within an eyewear frame. The eyewear frame, preferably, has temple pieces extending from hinged engagements to the frame on both of two ends.

On a first end of the eyewear frame is positioned a first mount which is configured to removably engage with a first connector at a first end of a protective lens and to engage against a first ledge at the base of the first connector. The second or opposite end of the eyewear or eyeglass frame, has a second mount and second ledge thereon, which is configured to removably engage with a second connector at the second end of the protective lens. Thus, the user may engage any protective lens upon the eyeglass frame holding the corrective lenses by a simple engagement of respective lens connectors positioned at both ends thereof with respective cooperatively configured mounts on the eyeglass frame.

Preferably the mount is engaged to the frame and configured with a mating connector which is complimentary to the connectors on the protective lens. Currently, such is provided by openings or apertures formed through the mounts which are shaped to engage around the exterior of the connectors. The first ledge adjacent the first connector will form a biased contact thereagainst, and the second ledge adjacent the second connector will form a biased contact against the second connector. The two biased contacts maintain both engagements and also help resist vertical movement of the protective lens. The two mounts, in contact against both respective ledges, hold the lens tensioned between the mounts, in an arched shape, spaced by a gap from the front surface of the eyewear frame which is most preferred.

As noted, these connections, along with the substantially equal base curved shape of the protective lens, form a fixed arch and when engaged impart tension or a slight biasing force into the central area of the lens in a direction away from the eyeglass frame. This is caused by the opposing force from the contact of the ledges which runs along the arched shape of the curve of the flexible material forming the protective lens. This tensioned mount or slight bias maintains the gap distance between the protective lens and the frame.

By the term protective lens as used herein, is meant any lens which will provide a lens removably fixed in front of rearward-positioned eyewear frame configured to hold lenses such as prescription vision correcting lenses. Such lenses are slightly flexible and made from material such as acrylic, polycarbonate, CR-39 or polyurethane, which cures to a solid but slightly flexible lens form. Such may be a protective lens for sun or glare protection which has a colorized tint, and/or polarization screen or film which will polarize and/or tint light transmitted therethrough. The term protective lens also includes protective lenses configured to protect the user from physical vision threats such as flash burn of the eyes, which occurs when the vision of a user is exposed to bright ultraviolet (UV) light such as from a welding torch or laser. Such may be clear or tinted or have polarizing film, and may have coatings or additives to the material forming the protective lens which will discolor and block the light emissions from a welder or arc from reaching the eyes of the user.

Because such protection from flash burn conventionally protects the eyes of the user but concurrently causes the destruction of the protective lens, the system herein works especially well since the user can engage another protective lens which is configured to removably engage with the respective mounts on the eyeglass frame.

In the preferred mode of the device herein, the base curve of the of the protective lens is such that it is substantially equal to the curve of the exterior surface of the eyeglass frame. Thus, when the protective lens is placed in mounted position upon an eyeglass frame, in front of any corrective lenses in that frame, the protective lens will be optically correct for viewing therethrough.

The resistance to rearward flexing by the placement of the lens under tension or a slight biasing force communicated across the arch of the flexible but fixed-fit shaped protective lens resists movement toward the frame because contact of both ends of the lens against the ledges adjacent the connectors will hold the protective lens in a removably mounted position and prevent the ends from moving away from each other. This tensioned positioning will be maintained until the user exerts force enough to slightly bend and pull the lens from the engagement by dismounting the two connectors from the mounts. Thus, the resistance to flexing toward the frame from the flexible resistance of the lens material and the curved shape of the lens, while engaged with the two opposing mounts, maintains the preferred gap to keep the lens from scuffing against the frame.

Thus, by forming such substantially equal curves and forming the second distance between the first and second ledges substantially equal to a first distance between the interior surfaces of the two mounts, the central portion of the lens is held firm by the slight biasing or tensioning resistant force in the direction away from the frame when the curved protective lens is pushed toward the frame. This maintains the protective lens slightly spaced by a gap from contact with the surface of the frame.

By substantially equal lengths is meant that the second distance between the two ledges is equal to or within 3 mm of the first distance between the facing sides of the first and second mounts. This insures fixed mounts at both ands and that there is substantially no flexing or continued bending of the curved protective lens outside of its formed curve, which would allow contact with the frame and which might effect the optical correctness of the protective lens, when the user views through the corrective lenses. Consequently, the curved flexible protective lens remains optically correct even when slightly biased by the engagement of the connectors on each end thereof with the mounts on the eyeglass frame or temples.

Additionally provided by the device herein, in another mode, is a curved contact or near contact of the interior surface of the curved protective lens against annular projecting portions of polymeric lens holders engaged within lens openings in the eyewear or eyeglass frame. Such polymeric lens holders allow for the easy positioning of ground corrective lenses in the appropriate position within a respective opening of the frame.

In the device and system herein, the annular polymeric lens holders may be formed with an annular projecting section which projects from each frame opening toward the front surface thereof. The annular projecting section is formed of a length to position it in contact, or almost in contact, with the lens. The annular projecting section thus projects slightly above the frame opening and projecting above the front surface of the frame, to form an annular projection at and around each frame opening.

By annular projection is meant that the polymeric projections have a generally circular shape projects preferably around the top and bottom edges of the opening in the frame at least and around substantially the entire circumference of both openings. This can be a continuous circular projection of formed of multiple projection areas with gaps therebetween.

The two annular projections, so provided, may project from the openings to a position slightly above the exterior or front surface of the eyeglass frame. So positioned, the annular projections provide a contact surface which will contact against the interior surface of the protective lens continuously, or it can be positioned to contact the lens as a bumper or shock absorber should it deflect slightly toward the frame.

The annular projections can also be in continuous biased contact against the protective lens by forming them slightly longer than the gap. The contact of two annular projections against the interior surface of the corrective lens will provide a significant enhancement to the stability of the mounted protective lens by holding it to prevent vertical movement as can occur in windy environments where the device herein is worn.

Essentially, the interior surface of the protective lens, can contact against contact surfaces of the two annular projections projecting above the front surface of the frame. This biased contact of both polymeric annular projections provides a soft frictional engagement at both positions. With the connectors at both ends of the protective lens engaged with mounts to the eyeglass frame, where wind or inward force may cause deflection of the protective lens toward the frame, contact will occur with the soft annular projections and not the frame surface. This prevents scratching by maintaining the game and also serves to prevent movement of the protective lenses in the horizontal direction from the force of wind.

Preventing unintentional dismount of the protective lens is most important during use where wind might be encountered by the user such as during sports or fast movement of the head may occur. Experimentation has shown contact of the protective lens with and against the two polymeric annular projections which can rise slightly above the front surface of the eyewear frame, yields significantly enhanced the resistance to forces which would flex the protective lens and reduce the gap, and resistance to vertical movement when under force from wind. The firm engagement of the two ends of the lens with and against the mounts on the frame, in addition to the outward force or resistance to deflection toward the frame imparted by the ledge at the base of the connectors against each mount, generates a sufficient bias or flex resistance to the central portion of the lens therebetween, to maintain its curve under force and to resist bending toward the frame.

In this configuration, as with the configuration without the projections, the maintained-gap will prevent scratching and currently a gap between the frame surface and the protective lens of between 0.1 mm to 3 mm is employed. Of course the gap could be larger and such is anticipated within the scope of this application. However, a larger gap can also allow for sunlight to communicate through a larger gap to the eye of the user and is not preferable.

The lens polymeric lens holders and the annular projections of a pliable polymeric material projecting therefrom, are preferably formed of a pliable polymeric material such as TPEE. Such worked well especially during wide temperature variances the eyewear might encounter. The preferred durometer of the polymeric material would be in a range on the D-scale between 40-90 shore to provide excellent soft frictional engagement when the protective lens contacts against it.

In one mode of the device, the annular projections will project above the front surface of the frame a distance equal to or exceeding the distance of the gap. This configuration will form a continuous contact against the interior surface of the protective lens. This mode allows for significantly more stability in high wind or G-forces. In a second mode of the device with the annular projections, they will project to distal ends above the front surface of the frame but in a distance slightly less than that of the gap. In this second mode with annular projections, they contact against the protective lens only when it is deflected toward the front surface of the frame, such as from the force of wind against the protective lens.

As such, for multiple reasons, the positioning of projecting polymeric annular portions of the lens holders mounted in or adjacent the openings of the eyeglass frame, where the device may be used in windy conditions would be advantageous, although the device will function well without them under pool side and other low force conditions with the gap maintained by the tension imparted to the flexible arch forming the curved protective lens from the ledge contact against the mounts.

It should be noted that while the annular projections herein are shown and taught as part of the polymeric corrective lens holders engaged within the openings of the frame, they could, in another more expensive mode, be adhered to the front surface of the frame. However, such is highly likely to dismount over time due to use and loss of adhesion so forming the annular projections as part of the polymeric lens holders works best.

The device herein can also be provided with a kit of protective lenses where each lens in the kit has the same connector configuration and distance between the opposing ledges at the base of the connectors to yield a removable engagement biased engagement to and against the two mounts on the eyeglass frame. Such a kit can include protective lenses of differing shapes to allow the user to change the appearance of the eyewear when worn. By shape is meant the perimeter edge of the formed protective lens and the area of the protective lens within the perimeter edge.

Such a kit may also have protective lenses of differing colors and polarizations and with different lens coatings which would allow for the user to pick the respective lens from the group in the kit, which will work best for the anticipated use at the time. For example, when riding bikes at dusk, the lens from the kit chosen may be copper tinted to enhance sight in the low light, whereas when riding bikes in the morning, a grey lens might be chosen to minimize bright sunlight. Such may also include lenses to protect from flash burn where the user may be near welding or other equipment.

With respect to the above description, before explaining at least one preferred embodiment of the herein disclosed eyewear with engageable lens in detail, it is to be understood that the disclosed lens holder herein is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed eyewear with engageable lenses. It is important, therefore, that the claims be regarded as including such equivalent construction and methodology insofar as they do not depart from the spirit and scope of the present invention.

The objects, features, and advantages of the present eyewear with removably engageable lenses as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE DRAWINGS

The accompanying drawings, which are incorporated herein and form a part of the specification, illustrate some, but not the only or exclusive, examples of embodiments and/or features of the lens holder invention herein. It is intended that the embodiments and figures disclosed herein are to be considered in all cases illustrative, rather than limiting.

Other aspects of the disclosed eyewear having a biased removable engagement of one or multiple protective lenses herein will be more readily understood when considered in conjunction with the accompanying drawings and the following detailed description, neither of which should be considered limiting.

DETAILED DESCRIPTION OF EMBODIMENTS

In this description, the directional prepositions of up, upwardly, down, downwardly, front, back, top, upper, bottom, lower, left, right, first, second, and other such terms refer to the drain plug device as it is oriented and appears in the drawings and are used for convenience only, and they are not intended to be limiting or to imply that the drain plug has to be used or positioned in any particular orientation.

Figure 1:
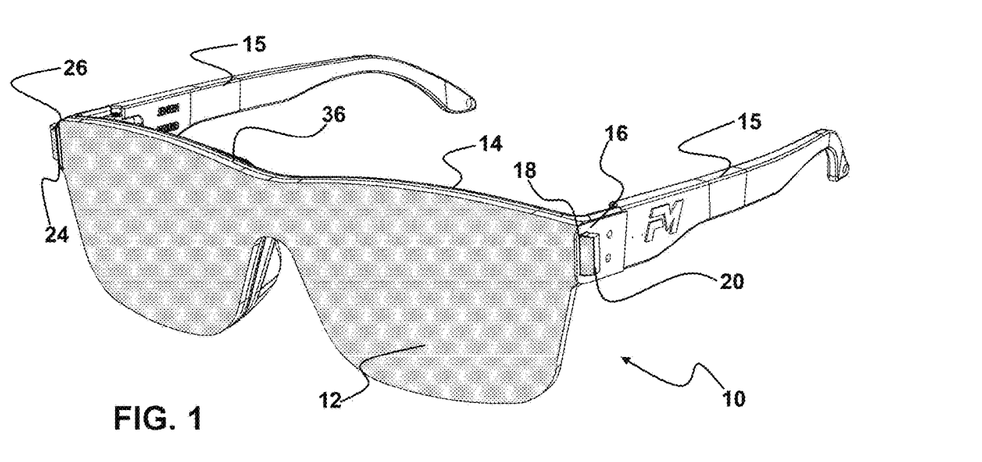
FIG. 1 shows the protective lens in a removable engagement to mounts positioned on opposite ends of an eyeglass frame which are engaged to the frame or temples extending therefrom, whereby the protective lens is held within and against both mounts, and the curve of the lens is maintained to maintain a gap from the eyewear frame.

Now referring to drawings in FIGS. 1-9, where similar components of the device 10 herein, are identified by like reference numerals, there is seen in FIG. 1 the device 10 having the protective lens 12 in a removable engagement to the eyewear frame 14 having temples 15 engaged thereto.

Figure 4:
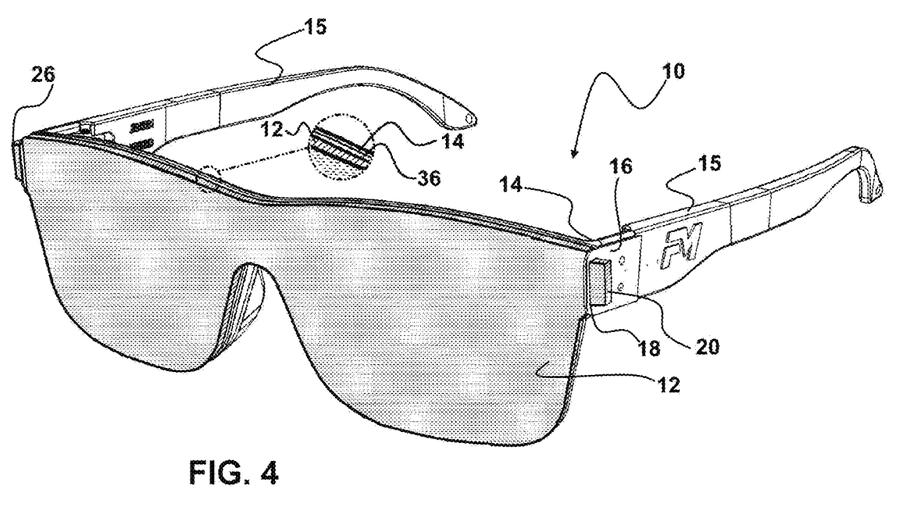
FIG. 4 shows the device, as in FIG. 1, with the protective lens in the engaged position and depicts an enlargement of an edge thereof showing the formed gap, which is maintained by the opposed contacts of the ledges against the mounts which prevent outward movement and flattening of the arch of the curved lens and cause the lens to bias or resist against movement toward the frame.

The removable engagement is formed by a first mount 16 and a second mount 24 in operative engagement with a respective first connector 20 and a second connector 26. As shown in FIGS. 1 and 4, the first mount 16 has a first aperture 18 into which a first connector 20 is inserted. A first ledge 22, at the base of the first connector 10, contacts against the first mount 16 with the first connector 20 positioned within the first aperture 18. At the opposite end of the protective lens 12, the second mount 24 is positioned within a second aperture 28 of the second mount 24. These two engagements of the ledges 22 and 30 against the mounts 16 and 24, fix the length of the arc of the curved lens between the first mount 16 and second mount 24.

With both ends of the protective lens fixed in position, the flexible arched or curved lens cannot easily flex toward the front surface of the frame 14, as such requires the two ends of the curved lens to move away from each other. Thus, the two engagements, fixing the position of opposing ends of the lens, cause a resistance to movement or flexure toward the frame 14 and maintain a gap 36 between the protective lens 12 and the frame 14.

In all modes of the device 10, preferably a first distance D1, between the first mount 16 and second mount 24, is substantially equal to a second distance D2 between a first ledge 22 adjacent the base or proximal end of the first mount 16 and a second ledge 30 adjacent the base or proximal end of the second mount 24. While D2 may be a few millimeters less or more than D1 and still maintain the gap, and thus substantially equal, it is preferred that both be substantially equal to maintain the optical correctness of the protective lens.

With the first connector 16 positioned in the first aperture 18 and the second connector 26 positioned in the second aperture 28, the first ledge 22 will in contact against the first mount 16 and the second ledge 30 will be in contact against the second mount 24. Such contacts, on both ends of the flexible curved protective lens 12, as noted, by preventing outward movement of the ends away from each other, and will cause the flexible protective lens 12 to maintain its arc or curve and biasly resist any flex or movement of the central portion thereof between the first connecter 20 and second connector 26, in a direction toward the frame 14.

The first aperture 18 on the first mount 16 and the second aperture 28 on the second mount 24 are positioned to locate a rearward edge 34 (FIG. 7) of each of the first aperture 18 and second aperture 28 a distance D3 (FIG. 7) from the front surface 32 of the frame 14. This distance D3 may be employed in design to determine the size of a gap (FIGS. 3-4) formed and maintained between the surface of the protective lens 12 and the front surface 32 of the frame 14.

As noted, the contact of the first ledge 22 against the first mount 16 and the second ledge 20 against the second mount 24, causes the curved lens 12 to resist movement toward the frame 14 and the arc or curve of the flexible material imparts a slight outward bias to the lens 12 against force, to maintain the gap 36. Thus, any lens 12, such as from a kit shown in FIG. 9, which has the above noted first connector 20 engageable with a first mount 16 and second connector 26 engageable with a second mount 24, which has substantially the same distance D1 between the mounts and D2 between the first ledge 22 and second ledge 30, can be mounted to the frame 14. This allows a user to change the protective lens 12 to one of a shape or filtering configuration needed or desired at the time.

Figure 2:
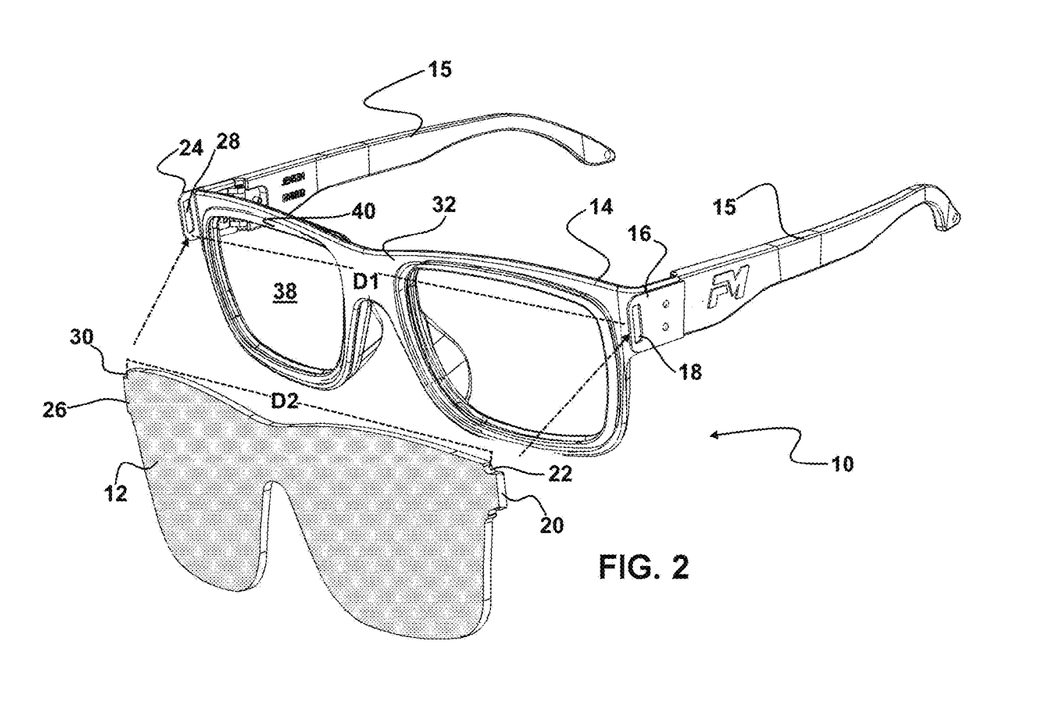
FIG. 2 shows the device, as in FIG. 1, depicting the protective lens separated from the engagement within and against the facing surfaces of the mounts engaged to the frame or temples.

In FIG. 2 is depicted the device 10, as in FIG. 1, but showing the protective lens 12 disengaged from the first mount 16 and second mount 24. As shown, a first distance D1 between the mounts 16 and 24, as noted, is substantially equal to the second distance D2 between the first ledge 22 and second ledge 30.

Also shown are lens openings 38 formed in the frame 14 which have polymeric lens holders 40 engaged on a circumferential edge thereof, which are configured to hold lenses 42 within the respective openings. Such may be any type of lens 42 but currently are preferred to be corrective lenses for the intended user, if needed.

Figure 3:
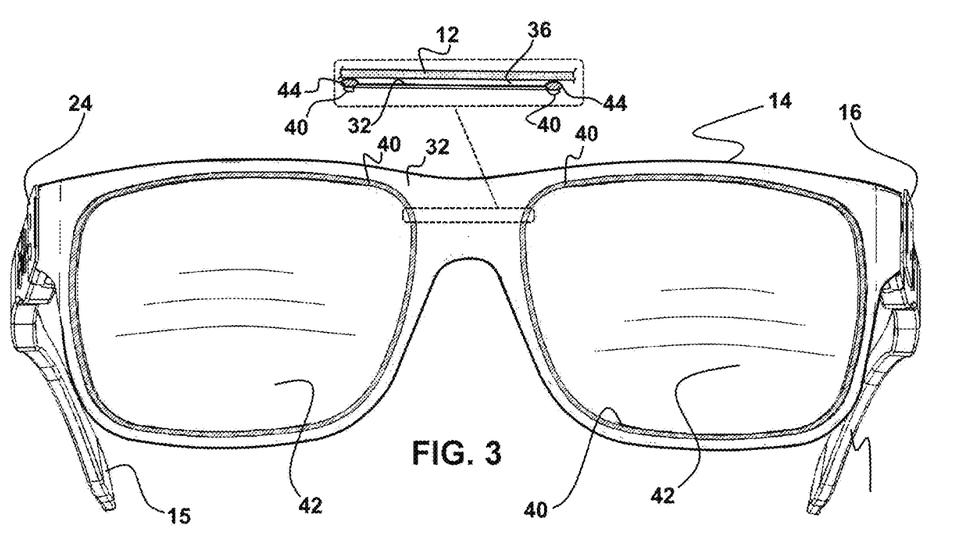
FIG. 3 shows a view of the front surface of the eyeglass frame showing two conventional polymeric lens holders which surround lenses positioned within two openings in the frame and showing an enlargement depicting projecting portions of the lens holders which project a distance above the front surface of the frame into the gap, to help maintain the gap therebetween.

Shown in FIG. 3 is a view of the front surface 32 of the eyeglass frame 14 showing two conventional polymeric lens holders 40 which surround lenses 42 positioned within two openings 38 in the frame 14. Also shown are an enlargement depicting projecting portions 44 from the lens holders 40 formed as part of the lens holders 40. As shown, the projecting portions 44 project into the gap 36 a distance above the front surface 32 of the frame 14. This positioning of the projecting portion 44, above the frame front surface 32, defines a bumper formed by the projecting portion 44 which provides either continuous contact against the lens or a contact therewith on slight flexing thereof. The bumper formed, thus, helps maintain the gap 36 therebetween under windy or other conditions which might impart sufficient force against the curved protective lens 12 to cause rearward deflection.

In FIG. 4 is shown the device 10, as in FIG. 1, with the protective lens 12 in the engaged position and depicts an enlargement of an edge thereof. In the enlargement is shown the formed gap 36 which is maintained by the opposed contact of the ledges 22 and 30 against the mounts 16 and 24 which fixes the curved protective lens 12 in a fixed length arch to resist flexing toward the frame 14 and thereby maintains the gap 36.

Figure 5:
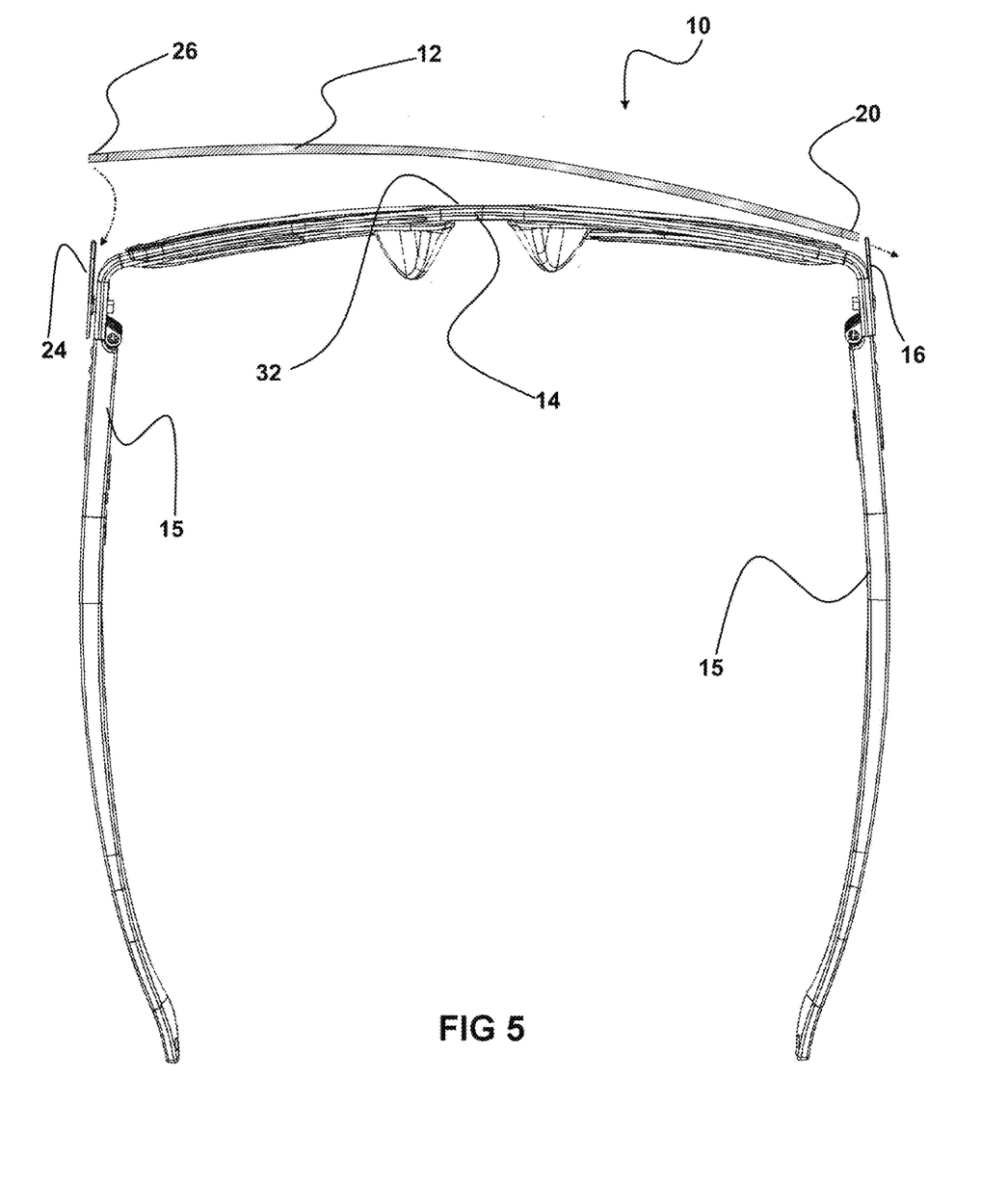
FIG. 5. depicts a protective lens being engaged to position the rear surface of the protective lens with a gap between the interior surface of the lens and the front surface of the eyewear frame or the projections thereon.

FIG. 5 depicts a protective lens 12 being engaged to position the protective lens 12 in engagement at both ends with respective mounts 16 and 24 by flexing the protective lens 12 sufficiently to position the connectors on opposite ends of the protective lens within respective mounts.

Figure 6:
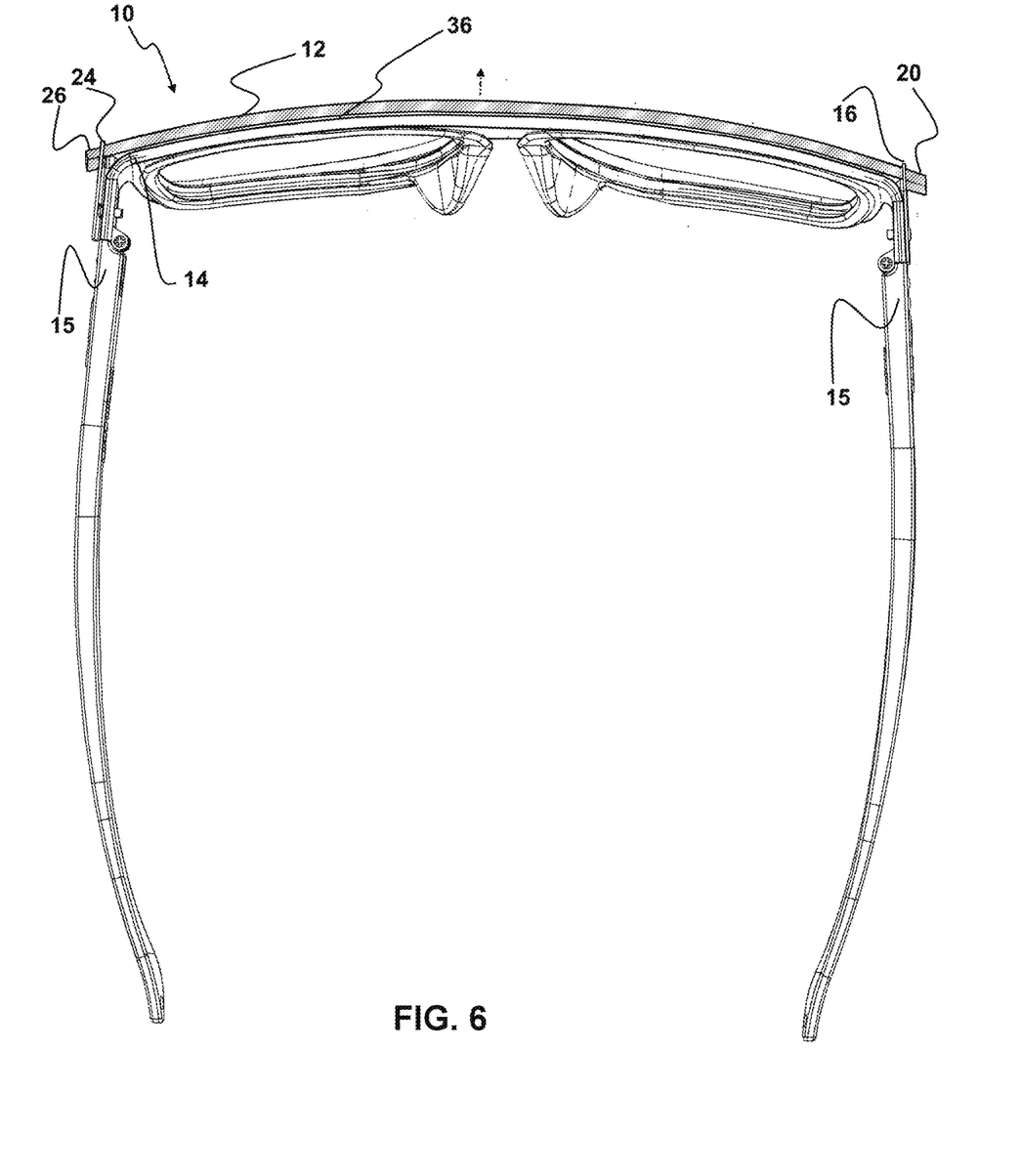
FIG. 6 depicts the protective lens of FIG. 5 showing the flexible lens having a curved shape, preferably substantially equal to the curve of the front of the eyewear frame, and showing the opposing engagements of the first and second ledges against the facing surfaces of the first and second mounts.

Shown in FIG. 6 is the protective lens of FIG. 5 showing the base curve of the protective lens 12 being substantially equal to the curve of the front surface 32 of the frame 14 and running in a substantially parallel line thereto. Also shown are the opposing respective contacts of the first and second ledges 22 and 30 against the first and second mounts 16 and 24. The contact of the ledges against the opposing mounts will prevent movement of the two ends of the curved protective lens 12 in a direction away from each other, as noted, and maintain a slight outward bias or resisting force to the central portion of the protective lens 12 in between the connectors 20 and 26. This resists flexure or movement into the gap and toward the frame 14.

Figure 7:
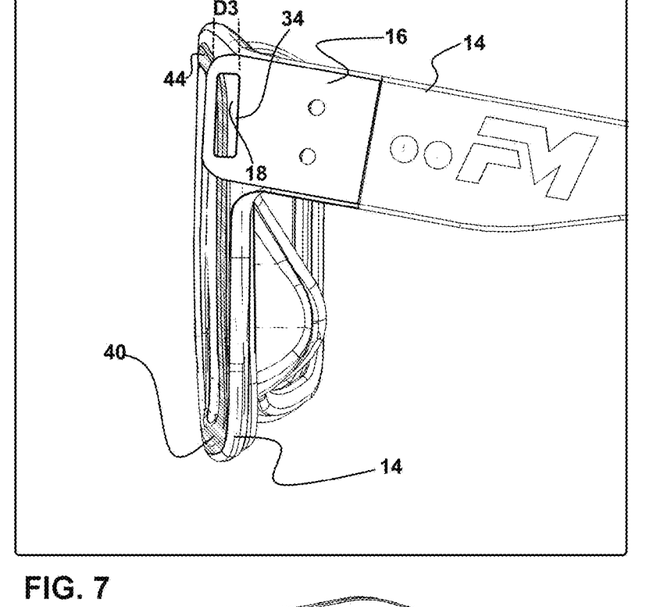
FIG. 7 depicts a side view of the eyeglass frame and a temple showing the aperture formed through the mounts through which connectors on the lens engage and showing a rearward edge of the aperture which positions the rear surface of the lens spaced from the frame.

Shown enlarged in FIG. 7 is a side view of the eyeglass frame 14 and temple 15 engaged thereto. Also shown is the first aperture 18 formed in the first mount 16. The same configuration is used on the second mount 24 which has the second aperture 28 therein. The positioning of a rear edge 34 of the apertures 18 and 28, a distance in front of the front surface 32 of the frame 14 locates the surface of the engaged protective lens 12 across the gap 36 from the front surface 32. Moving the rear edge closer to or further from the front surface 32 will adjust the size of the gap 36.

Figure 8:
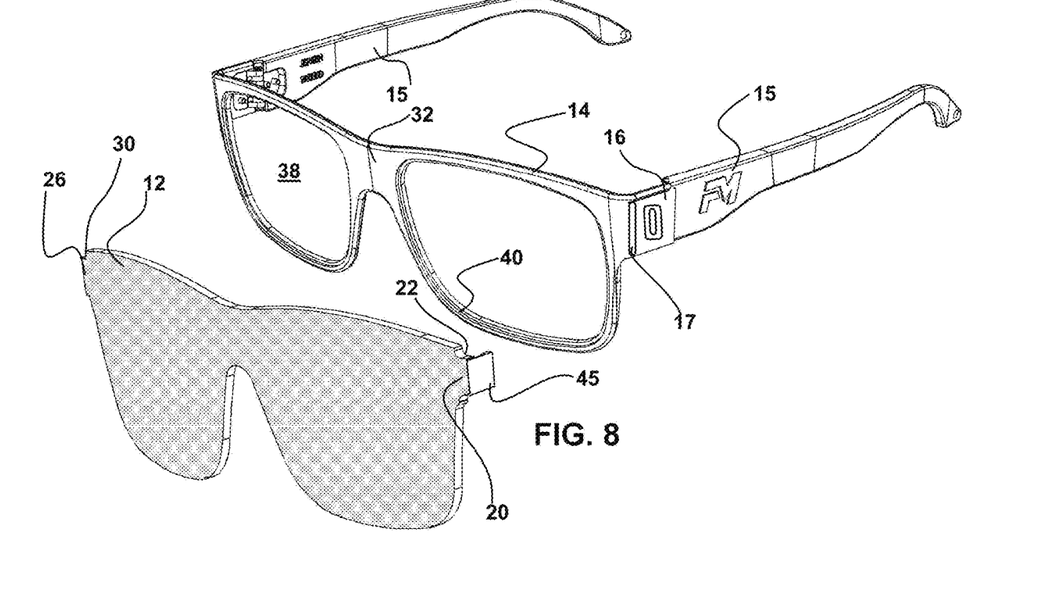
FIG. 8 depicts a mode of the device wherein the connector on the opposing ends of the protective lens, to fix both ends in position relative to each other, is of a different configuration and engages a slot positioned on the frame.

Shown in FIG. 8 is another mode of engaging a connector on opposite ends of the protective lens 12 to the frame to show, to those skilled in the art, that the projecting connectors shown in other drawings, while preferred for accuracy and ease of engagement and disengagement, are not the only mode to fix both of the ends of the lens 12 in position to prevent flexing toward the frame 14. In this mode a sliding connector 45 on both ends of the protective lens 12 will removably engage in a slot 17 defining the mount which is positioned on the frame 14. Other connectors and mounts can be employed with the device 10 herein, so long as they fix the position of opposing ends of the curved protective lens 12 to thereby form an arch from the curved protective lens 12 which forms the gap 36 and resists flexure toward the frame 14. However, currently, the mounts 20 and 26 and with respective ledges 22 and 30 have been found easy to use by users and are preferred.

Figure 9:
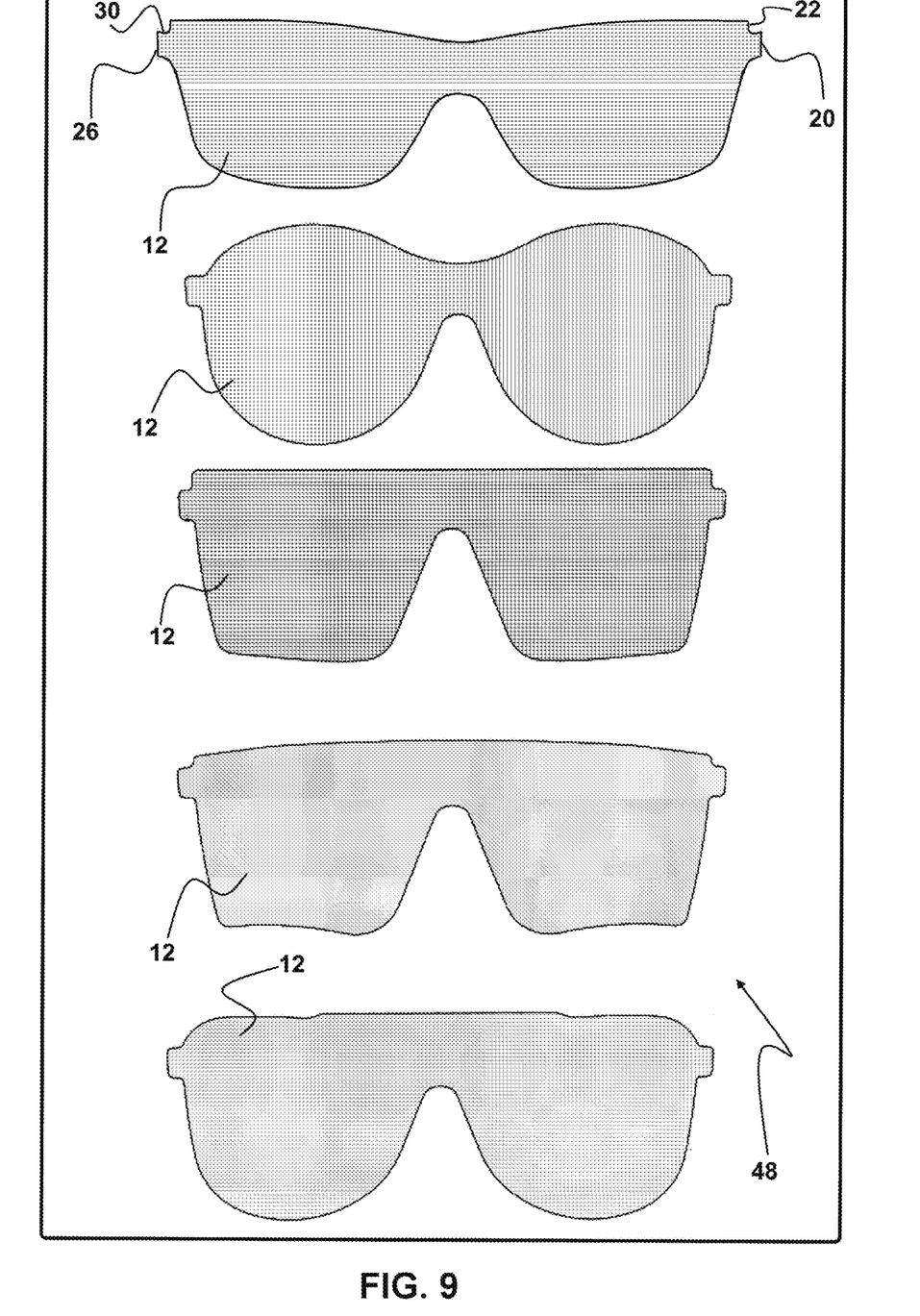
FIG. 9 shows a kit of protective lenses where each has the same configuration of connectors on opposing ends spaced as in D2 shown in FIG. 2, which is substantially equal to the distance D1 of FIG. 3 allowing any individual protective lens from the kit, to be mounted to an eyeglass frame in with the opposite ends and connectors thereon in contact with and against respective mounts.

In FIG. 9 is shown a kit 48 of protective lenses 12 where each has the same connectors 20 and 26 on opposing ends, and the distance D2 between the first ledge 22 and second ledge 30 is substantially equal to the distance D1 of the two mounts such as in FIG. 3, allowing any protective lens 12 from the kit 48 to be mounted to an eyeglass frame 14 in biased contact against the mounts 16 and 24. It should be noted that the connectors 20 and 26 could be altered to form a slot with a terminating end which will contact against the distal ends of each of the connectors 20 and 26. Such would thereby eliminate the need for the ledges 22 and 30 by using the distal edges of each of the mounts 20 and 26 as connections which fix the distance of the two ends of the flexible lens to the frame 14 and from moving away from each other.

While all of the fundamental characteristics and features of the disclosed eyewear device with biased removable protective lens herein have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An eyewear apparatus comprising:
an eyeglass frame, said eyeglass frame having a front surface and a rear surface and having a pair of openings therein for holding a pair of lenses;
a first temple engaged with a first end of said eyeglass frame;
a second temple engaged with a second end of said eyeglass frame opposite said first end thereof;
a first mount positioned at said first end of said eyeglass frame;
a second mount positioned at said second end of said eyeglass frame;
a protective lens, said protective lens formed of flexible lens material, said protective lens having a first connector on a first end thereof and a second connector on a second end thereof opposite said first connector;

said protective lens positionable to a removable engagement to said eyeglass frame by a first engagement of said first connector with said first mount, and a second engagement of said second connector with said second mount;

a qap formed between said protective lens and said front surface of said eyeglass frame;

said front surface of said eyeglass frame having a first curved surface;

said protective lens formed in a second curve running between said first end thereof and said second end thereof;

said second curve being substantially equal to said first curved surface;

said qap being curved and located in between said protective lens and said front surface of said eyeglass frame;

said eyeglass frame having openings therein;

said openings having polymeric lens holders therein for holding corrective lenses within said openings;

said lens holders having projecting portions extending therefrom into said gap; and said projecting portions defining bumpers contacting said protective lens during any deflection thereof toward said eyeglass frame.

2. The eyewear apparatus of claim 1, additionally comprising:

said protective lens being one of a kit having a plurality of protective lenses;

each one of said plurality of protective lenses in said kit having respective said first ledge positioned said second distance from a respective said second ledge; and whereby a user can removably engage any of said plurality of protective lenses in said kit, with said eyeglass frame.

3. An eyewear apparatus comprising:

an eyeglass frame, said eyeglass frame having a front surface and a rear surface and having a pair of openings therein for holding a pair of lenses;

a first temple engaged with a first end of said eyeglass frame;

a second temple engaged with a second end of said eyeglass frame opposite said first end thereof;

a first mount positioned at said first end of said eyeglass frame;

a second mount positioned at said second end of said eyeglass frame;

a protective lens, said protective lens formed of flexible lens material, said protective lens having a first connector on a first end thereof and a second connector on a second end thereof opposite said first connector;

said protective lens positionable to a removable engagement to said eyeglass frame by a first engagement of said first connector with said first mount, and a second engagement of said second connector with said second mount;

a gap formed between said protective lens and said front surface of said eyeglass frame;

said front surface of said eyeglass frame having a first curved surface;

said protective lens formed in a second curve running between said first end thereof and said second end thereof;

said second curve being substantially equal to said first curved surface;

said gap being curved and located in between said protective lens and said front surface of said eyeglass frame;

said first engagement of said first connector with said first mount, forming a first contact of said first end of said protective lens with said first mount;

said second engagement of said second connector with said second mount, forming a second contact of said second end of said protective lens with said second mount;

said first contact of said first end of said protective lens with said first connector preventing movement of said first end of said protective lens in a direction away from said second end of said protective lens;

said second contact of said second end of said protective lens with said second connector preventing movement of said second end of said protective lens in a direction away from said first end of said protective lens;

said eyeglass frame having openings therein;

said openings having polymeric lens holders therein for holding corrective lenses within said openings;

said lens holders having projecting portions extending therefrom into said gap; and said projecting portions defining bumpers contacting said lens during any deflection thereof toward said eyeglass frame.

4. The eyewear apparatus of claim 3, additionally comprising:

said protective lens being one of a kit having a plurality of protective lenses;

each one of said plurality of protective lenses in said kit having a respective said first ledge positioned said second distance from a respective said second ledge; and whereby a user can removably engage any of said plurality of protective lenses in said kit, with said eyeglass frame.

5. An eyewear apparatus comprising:

an eyeglass frame, said eyeglass frame having a front surface and a rear surface and having a pair of openings therein for holding a pair of lenses;

a first temple engaged with a first end of said eyeglass frame;

a second temple engaged with a second end of said eyeglass frame opposite said first end thereof;

a first mount positioned at said first end of said eyeglass frame;

a second mount positioned at said second end of said eyeglass frame;

a protective lens, said protective lens formed of flexible lens material, said protective lens having a first connector on a first end thereof and a second connector on a second end thereof opposite said first connector;

said protective lens positionable to a removable engagement to said eyeglass frame by a first engagement of said first connector with said first mount, and a second engagement of said second connector with said second mount;

a gap formed between said protective lens and said front surface of said eyeglass frame;

said front surface of said eyeglass frame having a first curved surface;

said protective lens formed in a second curve running between said first end thereof and said second end thereof;

said second curve being substantially equal to said first curved surface;

said gap being curved and located in between said protective lens and said front surface of said eyeglass frame;
said first engagement of said first connector with said first mount, forming a first contact of said first end of said protective lens with said first mount;
said second engagement of said second connector with said second mount, forming a second contact of said second end of said protective lens with said second mount;
said first contact of said first end of said protective lens with said first connector preventing movement of said first end of said protective lens in a direction away from said second end of said protective lens;
said second contact of said second end of said protective lens with said second connector preventing movement of said second end of said protective lens in a direction away from said first end of said protective lens;
said first mount having a first aperture therethrough;
said engagement of said first connector with said first mount being a positioning of said first connector through said first aperture;
said second mount having a second aperture therethrough;
said engagement of said second connector with said second mount being a positioning of said second connector through said second aperture;
said eyeglass frame having openings therein;
said openings having polymeric lens holders therein for holding corrective lenses within said openings;
said lens holders having projecting portions extending therefrom into said gap; and
said projecting portions defining bumpers contacting said protective lens during any deflection thereof toward said eyeglass frame.

6. An eyewear apparatus comprising:
an eyeglass frame, said eyeglass frame having a front surface and a rear surface and having a pair of openings therein for holding a pair of lenses;
a first temple engaged with a first end of said eyeglass frame;
a second temple engaged with a second end of said eyeglass frame opposite said first end thereof;
a first mount positioned at said first end of said eyeglass frame;
a second mount positioned at said second end of said eyeglass frame;
a protective lens, said protective lens formed of flexible lens material, said protective lens having a first connector on a first end thereof and a second connector on a second end thereof opposite said first connector;
said protective lens positionable to a removable engagement to said eyeglass frame by a first engagement of said first connector with said first mount, and a second engagement of said second connector with said second mount;
a gap formed between said protective lens and said front surface of said eyeglass frame;
said eyeglass frame having openings therein;
said openings having polymeric lens holders therein for holding corrective lenses within said openings;
said lens holders having projecting portions extending therefrom into said gap; and
said projecting portions defining bumpers contacting said protective lens during any deflection thereof toward said eyeglass frame.

* * * * *